(12) United States Patent
Ito (10) Patent No.: US 8,072,551 B2
(45) Date of Patent: Dec. 6, 2011

(54) PROJECTOR

(75) Inventor: Takafumi Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 475 days.

(21) Appl. No.: 12/370,788

(22) Filed: Feb. 13, 2009

(65) Prior Publication Data

US 2009/0207326 A1 Aug. 20, 2009

(30) Foreign Application Priority Data

Feb. 15, 2008 (JP) ................................. 2008-034116

(51) Int. Cl.
*H04N 5/74* (2006.01)

(52) U.S. Cl. .......................... 348/756; 348/748; 348/757

(58) Field of Classification Search .................. 348/748, 348/750, 756, 757, 778–781; 353/33, 34, 353/82; *H04N 5/74*
See application file for complete search history.

(56) References Cited

U.S. PATENT DOCUMENTS

| 7,207,676 B2 * | 4/2007 | Ishino | 348/757 |
| 7,621,641 B1 * | 11/2009 | Silverstein et al. | 348/750 |
| 2002/0071061 A1 * | 6/2002 | Ito et al. | 348/748 |

FOREIGN PATENT DOCUMENTS

JP            11-249070          9/1999

* cited by examiner

*Primary Examiner* — Sherrie Hsia (74) *Attorney, Agent, or Firm* — Maschoff Gilmore & Israelsen (57) ABSTRACT

A projector includes a plurality of light modulation elements adapted to modulate a plurality of colored light beams based on image data, a combining optical system adapted to combine the modulated colored light beams to emit image light, and a projection optical system adapted to project the image light emitted from the combining optical system on a projection screen. The light modulation elements are disposed with respect to the combining optical system so that long sides of the respective light modulation elements are adjacent to each other. Signal line cable boards adapted to provide the respective light modulation elements with signals, and coupled to short sides of the respective light modulation elements. A scanning direction of writing the image data to the light modulation elements is set to be parallel to a direction of the short side of an image display area in each of the light modulation elements.

5 Claims, 7 Drawing Sheets

PROJECTOR

BACKGROUND

1. Technical Field

The present invention relates to a projector.

2. Related Art

Projectors are capable of displaying large screen images, and therefore, draw attention not only as display devices for presentation, but also as image display devices for displaying images required to have high quality, such as movies. Therefore, in the projectors, growth of resolution of light modulation elements is in progress, and there is a tendency of ever-growing sizes of the light modulation elements. The growth of the light modulation element sizes causes growth of sizes of overall optical systems, which incurs growth of the sizes of the projectors, and at the same time, increase in cost.

The lower limit of the pitches of the pixels constituting the light modulation elements is generally believed to be in a range of 8 through 9 μm. Therefore, in order for obtaining the resolution of, for example, 4K2K (assumed to be 4096 pixels in the lateral direction×2160 pixels in the vertical direction), the size (the diagonal length) of the area (referred to as an image display area) available for image display in the light modulation elements needs to be equal to or greater than 1.6 inch.

Figure 6A:
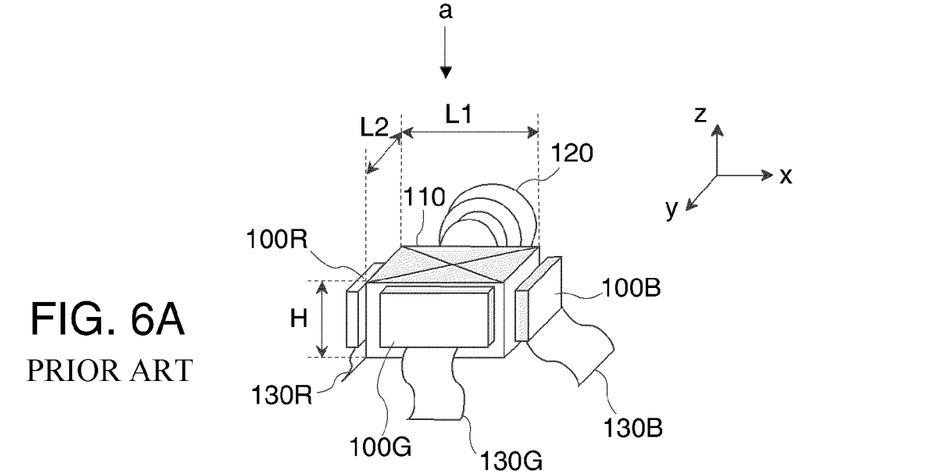
FIGS. 6A and 6B are diagrams showing a configuration of the light modulation element and the optical system in the periphery thereof in a typical projector.
Figure 6B:
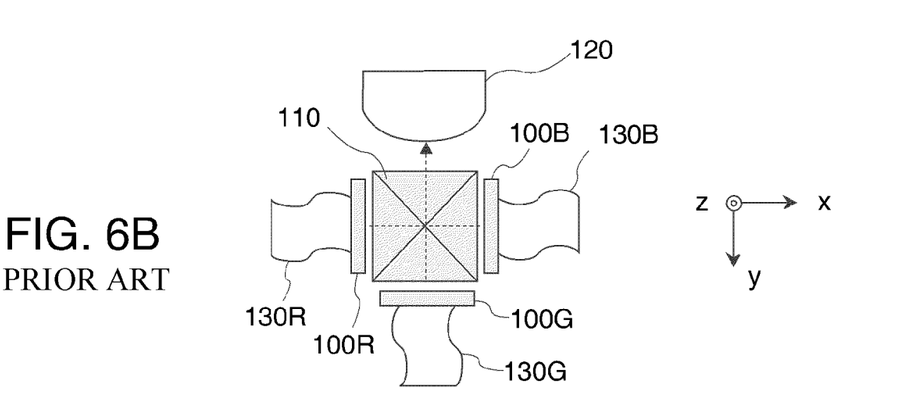

FIGS. 6A and 6B are diagrams showing a configuration of the light modulation element and the optical system in the periphery thereof in a typical projector in the related art. It should be noted that FIG. 6A is a perspective view, and FIG. 6B is a plan view corresponding to FIG. 6A, namely a diagram of the configuration shown in FIG. 6A viewed from a direction along the arrow a.

As shown in FIGS. 6A and 6B, in the typical projector, the light modulation elements 100R, 100G, and 100B corresponding respectively to red (R), green (G), and blue (B) are each disposed so as to have the long side in the horizontal direction (the direction of the x-axis or the y-axis among the x, y, and z-axes shown in FIG. 6A) and the short side in the vertical direction (the vertical direction in FIG. 6A, namely the direction of the z-axis among the x, y, and z axes). In other words, the light modulation elements 100R, 100G, and 100B are arranged so that one of the short sides of the light modulation element 100R and one of the short sides of the light modulation element 100G are adjacent to each other, and further the other of the short sides of the light modulation element 100G and one of the short sides of the light modulation element 100B are adjacent to each other, in a similar manner. Further, in this case, in the positional relationship between the light modulation elements 100R, 100G, and 100B, and a cross dichroic prism 110 as a combining optical system, each of the short sides of each of the light modulation elements 100R, 100G, and 100B is disposed along a height direction (the z-axis direction) of four triangular prisms forming the cross dichroic prism 110.

It should be noted that the light modulation elements 100R, 100G, and 100B are arranged to modulate the R, G, and B colored light beams, respectively, based on image data, and the colored light beams modulated by the respective light modulation elements 100R, 100G, and 100B are combined by the cross dichroic prism 110 to be output as image light. The image light emitted from the cross dichroic prism 110 is then projected by a projection optical system 120 on a projection screen, not shown, as a landscape image.

Further, to the light modulation elements 100R, 100G, and 100B, there are respectively connected signal line cable substrates 130R, 130G, and 130B each having various signal lines such as a data line for supplying the image data and a control line for supplying a control signal, printed thereon. It is general that these signal line cable substrates 130R, 130G, and 130B are each formed of a flexible printed circuit board, and connected respectively to the long sides of the light modulation elements 100R, 100G, and 100B. It should be noted that the signal line cable substrates 130R, 130G, and 130B are hereinafter referred to as FPC boards 130R, 130G, and 130B, respectively.

In the typical projector of the related art, the light modulation elements 100R, 100G, and 100B, and the cross dichroic prism 110 have the configuration shown in FIGS. 6A and 6B. Therefore, assuming that each of the light modulation elements 100R, 100G, and 100B has a resolution of, for example, 4K2K, the diagonal size of the image display area in each of the light modulation elements 100R, 100G, and 100B is about 1.6 inch as described above. The size of the cross dichroic prism 110 in the case of using such light modulation elements needs to be about 60 mm (one side L1 of the square composed of end surfaces of the respective four triangular prisms)×60 mm (the other side L2 of the square composed of end surfaces of the respective four triangular prisms)×35 mm (the height H of the triangular prisms), and further, the lens diameter of the projection optical system 120 needs to be equal to or greater than 70 mm. It should be noted that, assuming that the lens diameter of the projection optical system is 70 mm, the F-value of 2.5 can be achieved in the design giving priority to the brightness of the lens of the projection optical system.

As described above, in the typical projector of the related art, the higher the resolution of the light modulation element is, the further the growth of the sizes of the cross dichroicprism 110 and the projection optical system 120 proceeds, which forms a factor causing decrease in the productivity of these optical elements and increase in the cost thereof.

Figure 7A:
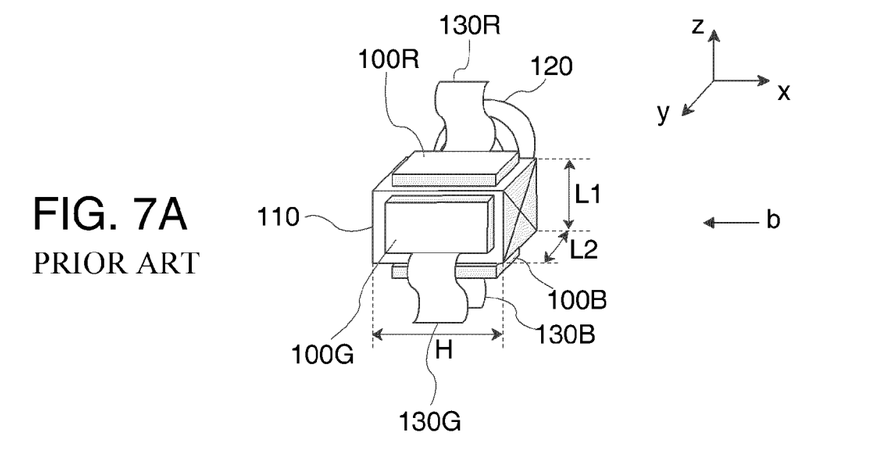
FIGS. 7A and 7B are diagrams showing a configuration of light modulation elements and an optical system in the periphery thereof in the case of arranging the light modulation elements so that the long sides thereof are adjacent to each other while keeping the respective long sides of the light modulation elements in a lateral direction (a horizontal direction).

To cope with the above, it is possible to arrange the light modulation elements 100R, 100G, and 100B so that the long sides of the respective light modulation elements 100R, 100G, and 100B are adjacent to each other while keeping the direction of the long sides of the respective light modulation elements 100R, 100G, and 100B to be the horizontal direction (the lateral direction in FIG. 7A) as shown in FIG. 7A. In this case, the light modulation elements 100R, 100G, and 100B have the arrangement in which each of the long sides of each of the light modulation is disposed along the height direction (the x-axis direction) of the four triangular prisms constituting the cross dichroic prism 110. It should be noted that FIG. 7A is a perspective view of the light modulation elements 100R, 100G, and 100B arranged so that the long sides thereof are adjacent to each other, and FIG. 7B is a side view corresponding to FIG. 7A, namely the diagram of the light modulation elements viewed in a direction along the arrow b.

Figure 7B:
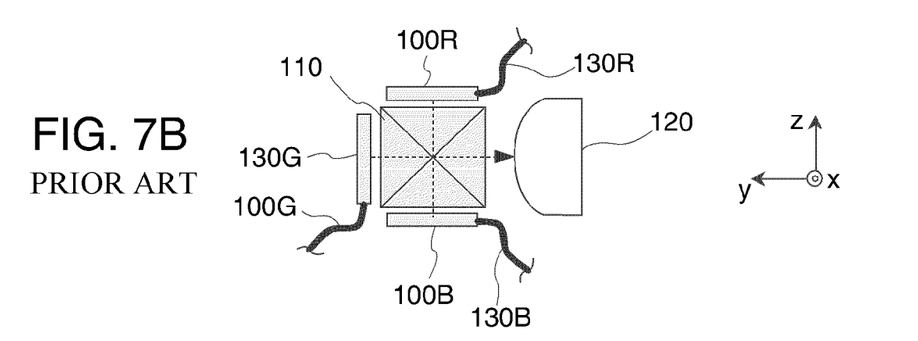

By arranging the light modulation elements 100R, 100G, and 100B so that the long sides thereof are adjacent to each other as shown in FIGS. 7A and 7B, the size of the cross dichroic prism 110 becomes about 35 mm (one side L1 of the square composed of end surfaces of the respective four triangular prisms)×35 mm (the other side L2 of the square composed of end surfaces of the respective four triangular prisms)×60 mm (the height H of the triangular prisms) even in the case with the light modulation elements having the same resolution as that of the light modulation elements 100R, 100G, and 100B shown in FIGS. 6A and 6B. Further, the lens diameter of the projection optical system becomes about 45 mm. Therefore, the volume of the cross dichroic prism 110 can be reduced to about 60% of that in the case shown in FIGS. 6A and 6B. Further, in this case, it is possible to achieve the F-value of 2.0 by designing the lens diameter of the projection optical system to be 50 mm, and therefore, downsizing is thought to be possible while keeping the same performance as in the case shown in FIGS. 6A and 6B.

However, if the light modulation elements 100R, 100G, and 100B are arranged so that the long sides thereof are adjacent to each other, there arises a problem that at least one of the FPC boards 130R, 130G, and 130B connected respectively to the light modulation elements 100R, 100G, and 100B shields the light input from a light source to the respective light modulation elements 100R, 100G, and 100B, thus the light from the light source is prevented from appropriately entering the light modulation elements 100R, 100G, and 100B, respectively.

Figure 8:
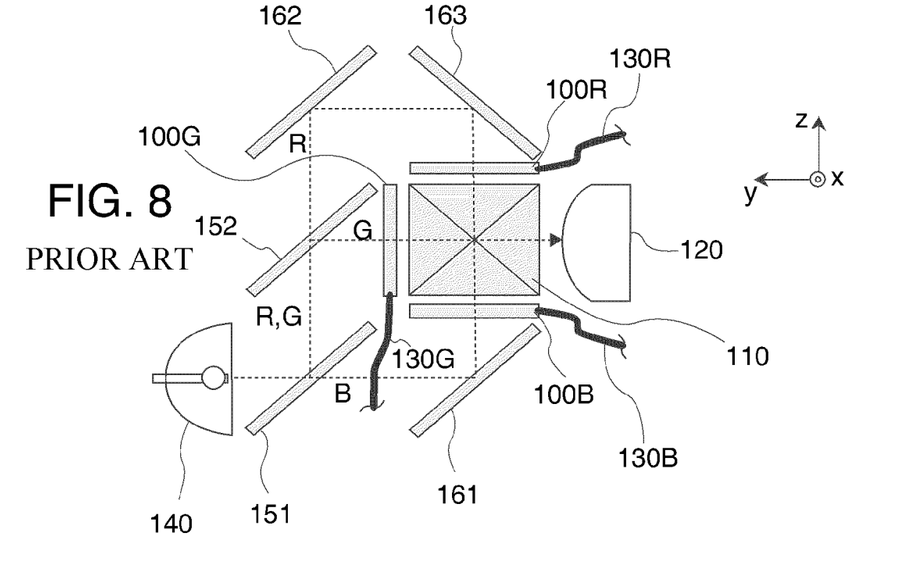
FIG. 8 is a diagram schematically showing a general configuration of the optical system of the projector in the case in which the light modulation elements are arranged as shown in FIGS. 7A and 7B.

FIG. 8 is a diagram schematically showing a general configuration of the optical system of the projector in the case in which the light modulation elements 100R, 100G, and 100B are arranged as shown in FIGS. 7A and 7B. As shown in FIG. 8, the light from the light source 140 is separated by a first dichroic mirror 151 into the red light (R), the green light (G), and the blue light (B), and the blue light (B) thus separated is input by a mirror 161 to the light modulation element 100B while the red light (R) and the green light (G) thus separated from the blue light (B) is separated by a second dichroic mirror 152 into the red light (R) and the green light (G). Further, the green light (G) separated by the second dichroic mirror 152 is input to the light modulation element 100G while the red light (R) is input by mirrors 162, 163 to the light modulation element 100R.

In the optical system shown in FIG. 8, when considering, for example, the light modulation element 100G corresponding to the green light (G), the FPC board 130G is coupled to the lower long side of the light modulation element 100G as shown in the drawing in the light modulation element 100G of the green light (G), and consequently, shields the blue light (B) separated by the dichroic mirror 151.

It should be noted that although the FPC board can be curved or bent within an appropriate angle, if the FPC board is bent at an excessively acute angle or an excessive twist or the like is applied to the FPC board, a broken line or the like might be caused. Therefore, the FPC board needs to be connected to other devices in a manner not providing the FPC board with folding with an excessively acute angle or an excessive twist. Therefore, if the light modulation elements 100R, 100G, and 100B are arranged so that the long sides thereof are adjacent to each other, at least one of the FPC boards 130R, 130G, and 130B should exist on the light path as shown in FIG. 8.

As a method for coping with this problem, it is possible to connect the FPC boards 130R, 130G, and 130B to the short sides of the respective light modulation elements 100R, 100G, and 100B. For example, JP-A-11-249070 (Document 1) shows a technology (hereinafter referred to as a related art technology) of arranging the light modulation elements so as to have the long sides adjacent to each other, and at the same time connecting the FPC boards to the short sides of the respective light modulation elements. By thus arranging the light modulation elements so as to have the long sides of the respective light modulation elements adjacent to each other, downsizing of the cross dichroic prism becomes possible, and further, by connecting the FPC boards to the short sides of the respective light modulation elements, it becomes possible to remove the FPC boards connected to the respective light modulation elements from the light paths of the respective colored light beams, thus an advantage of preventing the FPC boards from shielding the colored light beams can be obtained.

However, if it is arranged to connect the FPC boards simply to the short sides, there arises the following problem. The scanning direction for image data writing in the typical projector is set to be parallel to a direction (referred to as a long side direction) along the long side. Therefore, in the case of the light modulation element having a resolution of 4K2K, 4096 signal lines disposed along the long side are necessary for providing each of the pixels of the light modulation element. Therefore, if the FPC board is connected simply to the short side thereof while keeping the scanning direction for image data writing to the long side direction, a wiring space for leading the 4096 signal lines to the FPC board provided on the short side is required. This causes growth in overall size of the light modulation element.

Figure 9A:
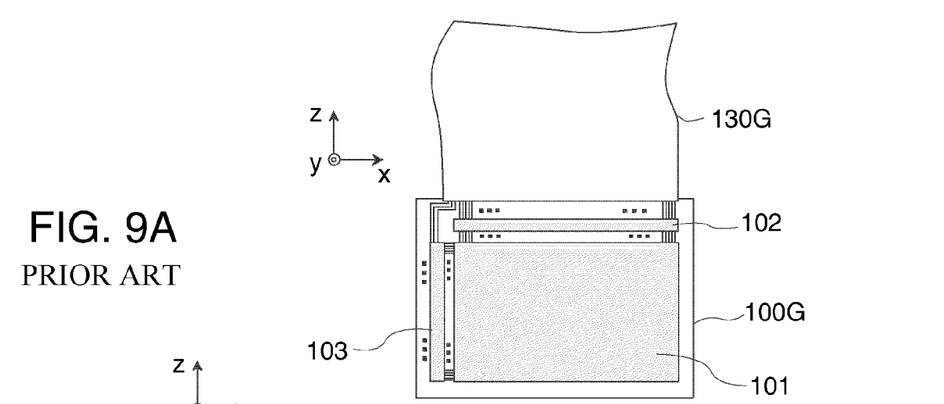
FIGS. 9A and 9B are diagrams schematically showing an arrangement of signal lines of a light modulation element.
Figure 9B:
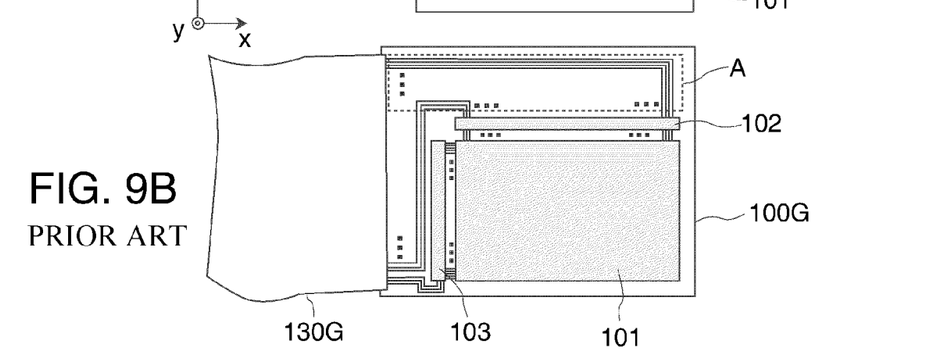

FIGS. 9A and 9B are diagrams schematically showing the arrangement of the signal lines of the light modulation element. Although the light modulation element 100G for the green light (G) is shown in FIGS. 9A and 9B, the light modulation elements 100R and 100B for the red light (R) and the blue light (B) have substantially the same configurations. It should be noted that FIG. 9A shows the typical light modulation element having the FPC board 130 coupled to the long side thereof, and in this case, there is adopted a configuration in which the 4096 signal lines from the FPC board 130G are connected to a data line driver 102 disposed along the long side (the long side of the image display area 101) of the light modulation element 100G. It should be noted that in the configuration, a gate line driver 103 is disposed on the short side (the short side of the image display area 101) of the light modulation element 100G, and a few signal lines for control from the FPC board 130G are connected to the gate line driver 103.

FIG. 9B shows the case in which the FPC board 130G is coupled to the short side of the light modulation element 100G shown in FIG. 9A. In the case in which the FPC board 130G is coupled to the short side of the light modulation element 100G, the wiring space (the area A surrounded by the dotted frame in the drawing) for leading the 4096 signal lines connected to the data line driver 102 disposed on the long side to the FPC board 130G coupled to the short side is required as shown in FIG. 9B. Since an area of at least 10 mm in size in the z-axis direction shown in the drawing is required as the wiring space, which causes the growth in the overall size of the light modulation element.

Therefore, if the FPC boards are simply coupled to the short side while keeping the long side direction of the light modulation elements 100R, 100G, and 100B to the scanning direction for the image data writing, it is hardly possible to make the most use of the advantage obtained by disposing the light modulation elements 100R, 100G, and 100B so as to have the long sides adjacent to each other, namely the advantage of making it possible to downsize the cross dichroic prism and the projection optical system.

SUMMARY

An advantage of some aspects of the invention is to provide a projector allowing downsizing of the combining optical system and the projection optical system even in the case of using a high resolution light modulation element.

A projector according to a first aspect of the invention includes a plurality of light modulation elements adapted to modulate a plurality of colored light beams with respective color components based on image data, a combining optical system adapted to combine the colored light beams, which are modulated by the respective light modulation elements, to emit the combined colored light beams as image light, and a projection optical system adapted to project the image light emitted from the combining optical system on a projection screen, and, the light modulation elements are disposed with respect to the combining optical system so that long sides of the respective light modulation elements are adjacent to each other, signal line cable boards adapted to provide the respective light modulation elements with signals, and coupled to short sides of the respective light modulation elements, and a scanning direction of writing the image data to the light modulation elements is set to be parallel to a direction of the short side of an image display area in each of the light modulation elements.

According to the projector of the first aspect of the invention, the light modulation elements are disposed with respect to the combining optical system so that the long sides of the respective light modulation elements are adjacent to each other. In this case, the relationship between the light modulation elements and the cross dichroicprism as the combining optical system corresponding to an arrangement in which the long sides of the light modulation elements are disposed along the height direction of the triangular prisms forming the cross dichroic prism. Thus, the volume of the combining optical system (the cross dichroic prism) can be reduced, thus achieving the downsizing of the combining optical system (the cross dichroic prism). Thus, the increase in productivity and the reduction in the cost of the optical elements such as the combining optical system (the cross dichroic prism) or the projection optical system can be achieved. Further, according to the present aspect of the invention, since the focal length of the projection optical system can be shortened, a higher luminance can easily be achieved using a bright lens with a rather large aperture.

Further, according to the projector in the first aspect of the invention, since the light modulation elements are disposed so that the long sides thereof are adjacent to each other, and the signal line cable boards (FPC boards) are coupled to the short sides of the respective light modulation elements, the problem that the FPC board shields the colored light beams input to the light modulation elements can be avoided.

Further, in the projector of the first aspect of the invention, the scanning direction of writing the image data to each of the light modulation elements is set to be parallel to the direction (referred to as a short side direction) along the short side of the image display area in each of the light modulation elements. Thus, in the case in which the FPC board is coupled to the short side of each of the light modulation elements, the wiring space for leading a number of data lines from the data line driver to the FPC board can be made smaller, thus the overall size of the light modulation element can be reduced to be a smaller size. Further, by setting the scanning direction for writing to be parallel to the short side direction, the number of data lines can also be reduced, thus the advantage of reducing the width of the FPC board can also be obtained.

Further, the projector according to the first aspect of the invention preferably includes an image data processing device including a first frame memory and a second frame memory each capable of holding the image data to be displayed corresponding to one frame, an address information generation section adapted to generate address information for executing writing and retrieving the image data on the first frame memory and the second frame memory, a frame memory control section adapted to control writing and retrieving of the image data on the first frame memory and the second frame memory based on the address information from the address information generation section, and a light modulation element drive section adapted to drive each of the light modulation elements based on the image data retrieved from either one of the first frame memory and the second frame memory, and the frame memory control section, while writing the image data corresponding to one frame in one of the first frame memory and the second frame memory, retrieves the image data corresponding to one frame previously written in the other of the first frame memory and the second frame memory, and converts the scanning direction of writing the image data into the direction of the short side of the image display area of each of the light modulation elements in one of writing and retrieving the image data.

By adopting the configuration of writing of the image data and retrieving of the image data are executed on the separate frame memories as described above, the scanning direction conversion process for setting the scanning direction for writing to be parallel to the short side direction can appropriately be executed. In other words, if it is attempted to execute the scanning direction conversion process with a single frame memory, when executing retrieving of the image data from the frame memory in order for setting the scanning direction for writing to be parallel to the short side direction, there might be caused a problem that, for example, the image data written as the image data for the subsequent frame exists in an area with the address for the data corresponding to a certain pixel on which the retrieving process is executed. In contrast, as in the case with the invention, by executing the writing and retrieving of the image data on the separate frame memories, such a problem can be solved, and the image data corresponding to the one frame can appropriately be retrieved with the scanning direction parallel to the short side direction.

Further, in the projector according to the first aspect of the invention, it is preferable that the frame memory control section controls executing writing and retrieving of the image data on the first frame memory and the second frame memory so that the writing of the image data corresponding to the one frame and the retrieving of the image data corresponding to one frame are executed in sync with each other.

As described above, by making the writing of the image data corresponding to one frame to one of the frame memories and the retrieving of the image data corresponding to one frame from the other of the frame memories are executed in sync with each other, the process of writing the image data corresponding to one frame and the process of retrieving the image data corresponding to one frame becomes possible continuously, and it becomes possible to output the retrieved image data to the light modulation element drive section as the image data with the continuous frames.

A projector according to a second aspect of the invention includes a plurality of light modulation elements adapted to modulate a plurality of colored light beams with respective color components based on image data, a combining optical system adapted to combine the colored light beams, which are modulated by the respective light modulation elements, to emit the combined colored light beams as image light, and a projection optical system adapted to project the image light emitted from the combining optical system on a projection screen, and a cooling device adapted to cool at least the light modulation elements, and, the light modulation elements are disposed with respect to the combining optical system so that long sides of the respective light modulation elements are adjacent to each other, and signal line cable boards adapted to provide the respective light modulation elements with signals are coupled to short sides of the respective light modulation elements, and the cooling device is disposed so as to flow the cooling air from the cooling device along a direction of the long side of each of the light modulation elements.

According to the projector of the second aspect of the invention, similarly to the projector of the first aspect of the invention, there can be obtained the advantage that the downsizing of the composing optical system (the cross dichroic prism) can be achieved, and the problem that the FPC board shields the colored light input to the light modulation element can be solved. Further, according to the projector in the second aspect of the invention, it is arranged that the cooling air from the cooling device is made to flow along the long side direction of the light modulation elements. This means that the cooling air is made to flow laterally, by flowing the cooling air in the lateral direction, there can be obtained an advantage of reducing the chances of stacking the dust on the light modulation elements and the cross dichroic prism. In other words, the dust generally falls in a direction of gravitational force, and by flowing the cooling air in a direction perpendicular to the gravitational direction, the chances of accumulating the dust on the light modulation elements or the cross dichroic prism and so on can be reduced.

It should be noted that also in the second projector according to this aspect, it is preferable to have the same feature as the projector of the first aspect of the invention.

Further, in the projector according to the second aspect of the invention, it is preferable that a scanning direction of writing the image data to the light modulation elements is set to be parallel to a direction of the short side of an image display area in each of the light modulation elements.

Thus, in the case in which the FPC board is coupled to the short side of each of the light modulation elements, the wiring space for leading a number of data lines from the data line driver to the FPC board can be made smaller, thus the overall size of the light modulation element can be reduced to be a smaller size in addition to the advantage that the chances of accumulating the dust on the light modulation elements and the cross dichroic prism can be reduced. Further, by setting the scanning direction for writing to be parallel to the short side direction, the number of data lines can also be reduced, thus the advantage of reducing the width of the FPC board can also be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some embodiments of the invention will be explained.

First Embodiment

Figure 1A:
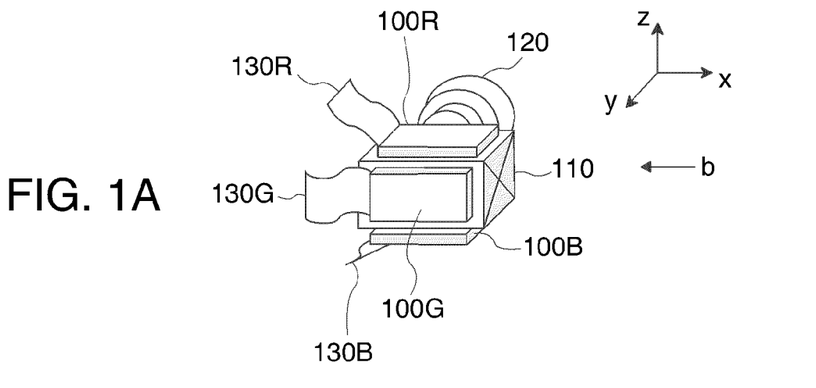
FIGS. 1A and 1B are diagrams showing a configuration of light modulation elements and an optical system in the periphery thereof in the projector according to a first embodiment.
Figure 1B:
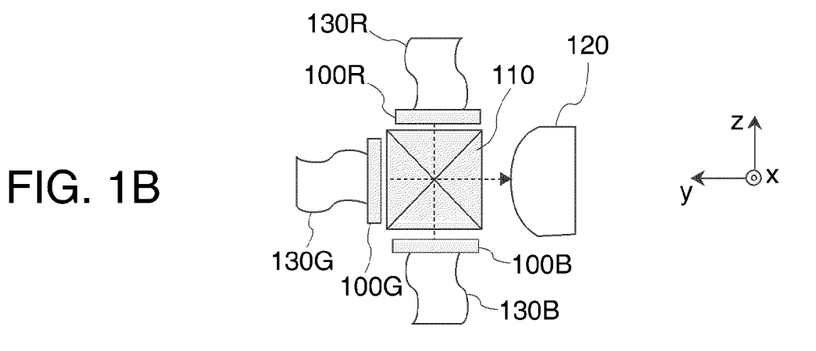

FIGS. 1A and 1B are diagrams showing a configuration of light modulation elements and an optical system in the periphery thereof in a projector according to a first embodiment, and in particular showing an image light forming optical system including a plurality of light modulation elements (assumed to be light modulation elements 100R, 100G, and 100B corresponding respectively to R, G, and B) and a cross dichroic prism 110 as a combining optical system, and a projection optical system 120. It should be noted that FIG. 1A is a perspective view, and FIG. 1B is a plan view corresponding to FIG. 1A, namely a diagram of the configuration shown in FIG. 1A viewed from a direction along the arrow b.

As shown in FIGS. 1A and 1B, in the projector according to the present embodiment of the invention, the light modulation elements 100R, 100G, and 100B corresponding respectively to the red light (R), the green light (G), and the blue light (B) are arranged so that the long sides thereof are adjacent to each other. In other words, one of the long sides of the light modulation element 100G and one of the long sides of the light modulation element 100R are disposed adjacent to each other, and similarly, the other of the long sides of the light modulation element 100G and one of the long sides of the light modulation element 100B are disposed adjacent to each other. It should be noted that in FIGS. 1A and 1B, -z direction in the z-axis corresponds to the direction of the gravitational force. Therefore, it is assumed that the projector according to the first embodiment has a bottom section (the side provided with legs of the projector) of the projector on the -z direction side of the image light forming optical system. Further, it is also assumed that each of the light modulation elements 100R, 100G, and 100B has a resolution of 4K2K (assumed to be 4096 pixels in the lateral direction×2160 pixels in the vertical direction).

Further, in this case, in the positional relationship between the light modulation elements 100R, 100G, and 100B, and a cross dichroic prism 110, the light modulation elements 100R, 100G, and 100B are disposed so that each of the long sides of each of the light modulation elements 100R, 100G, and 100B is disposed along a height direction (the x-axis direction) of four triangular prisms forming the cross dichroic prism 110. Further, in the projector according to the first embodiment, there is adopted a configuration of coupling the FPC boards 130R, 130G, and 130B respectively to the short side of the light modulation elements 100R, 100G, and 100B.

Figure 2:
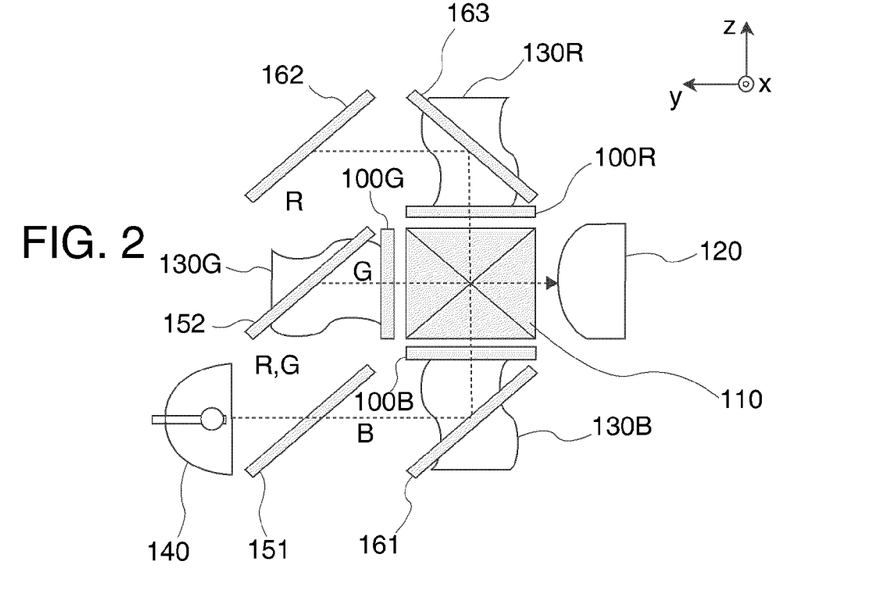
FIG. 2 is a diagram schematically showing a general configuration of the optical system of the projector in the case in which the light modulation elements 100R, 100G, and 100B are arranged as shown in FIGS. 1A and 1B.

FIG. 2 is a diagram schematically showing a general configuration of the optical system of the projector in the case in which the light modulation elements 100R, 100G, and 100B are arranged as shown in FIGS. 1A and 1B. In the optical system shown in FIG. 2, the arrangement of the optical constituents is substantially the same as the configuration shown in FIG. 8, and the same sections are denoted with the same reference numerals. The configuration shown in FIG. 2 is different from the configuration shown in FIG. 8 in that the FPC boards 130R, 130G, and 130B are coupled to the short sides of the respective light modulation elements 100R, 100G, and 100B in the configuration shown in FIG. 2, while the FPC boards 130R, 130G, and 130B are coupled to the long sides of the respective light modulation elements 100R, 100G, and 100B in the configuration shown in FIG. 8.

As described above, in the configuration of the optical system of the projector according to the first embodiment, the light modulation elements 100R, 100G, and 100B are disposed so that the long sides thereof are adjacent to each other, and at the same time, the FPC boards 130R, 130G, and 130B are coupled to the short sides of the respective light modulation elements. Although the configuration described hereinabove is substantially the same as the related art (the technology disclosed in the Document 1) described above, in the projector according to the first embodiment, downsizing of the size of each of the light modulation elements 100R, 100G, and 100B becomes possible by setting the scanning direction for the image data writing in each of the light modulation elements 100R, 100G, and 100B to be parallel to the short side direction of the image display area in each of the light modulation elements.

It should be noted that in the present specification, "the scanning direction for writing" denotes the high-speed scanning out of the high-speed scanning (so-called "horizontal scanning") and the low-speed scanning (so-called "vertical scanning"). In other words, in the embodiment of the invention, the real vertical direction (the z-axis direction in each of the drawings) and the high-speed scanning direction become substantially parallel to each other (the real vertical direction and the so-called horizontal scanning direction become substantially parallel to each other). Further, hereinafter, "the scanning direction for writing" is simply denoted as "the scanning direction."

Figure 3:
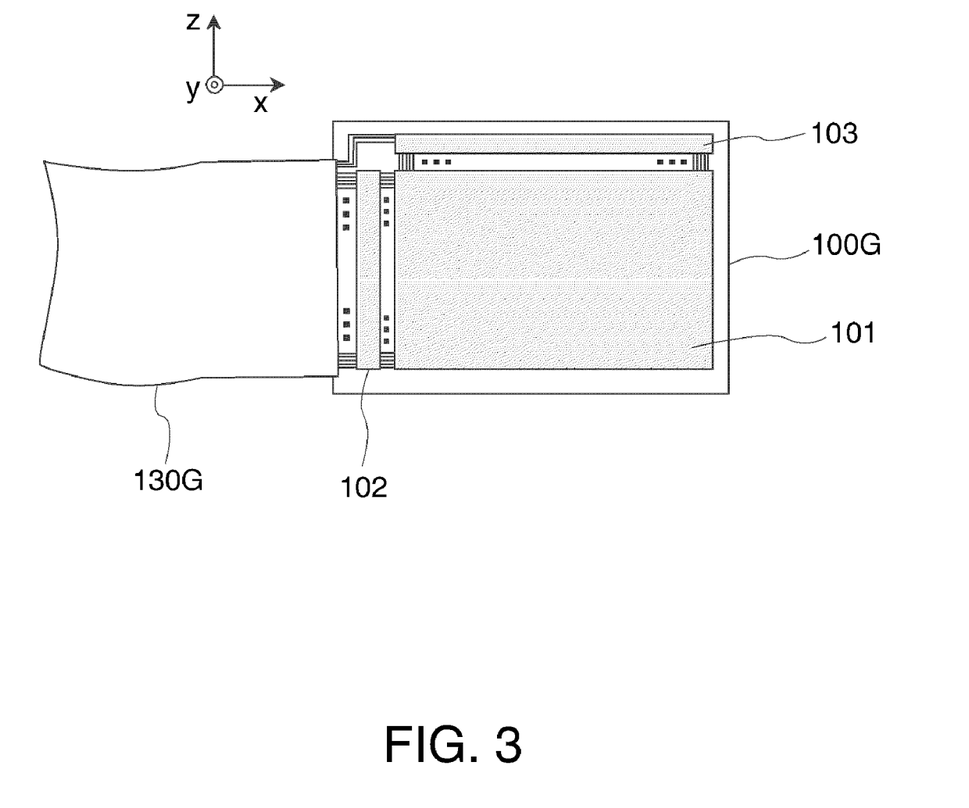
FIG. 3 is a diagram schematically showing an arrangement of signal lines of the light modulation element of the projector according to the first embodiment.

FIG. 3 is a diagram schematically showing an arrangement of signal lines of the light modulation element of the projector according to the first embodiment. Although the light modulation element 100G for the green light (G) is shown in FIG. 3, the light modulation elements 100R and 100B for the red light (R) and the blue light (B) have substantially the same configurations.

In the projector according to the first embodiment, the scanning direction of each of the light modulation elements 100R, 100G, and 100B is set to be parallel to the short side direction. Therefore, as shown in FIG. 3, in the configuration, the data line driver 102 is disposed on the short side of each of the light modulation elements (FIG. 3 shows the light modulation element 100G), and the data lines for supplying the image data from the FPC board 130G are connected to the data line driver 102. In this case, the light modulation element 100G is a light modulation element of 4K2K, and therefore, has 2160 data lines corresponding to the number of pixels arranged in the short side direction. Meanwhile, on the long side of the light modulation element 100G, there is disposed a gate line driver 103. To the gate lined river 103, there are connected a few signal lines such as a signal line for control.

By providing the structure shown in FIG. 3 to each of the light modulation elements 100R, 100G, and 100B, the wiring space (the area A surrounded by the dotted line frame shown in FIG. 9B) for leading the data lines to the short side as in the light modulation element shown in FIG. 9B, for example, can be eliminated, therefore, it is possible to downsize the overall light modulation element while keeping the resolution.

Figure 4:
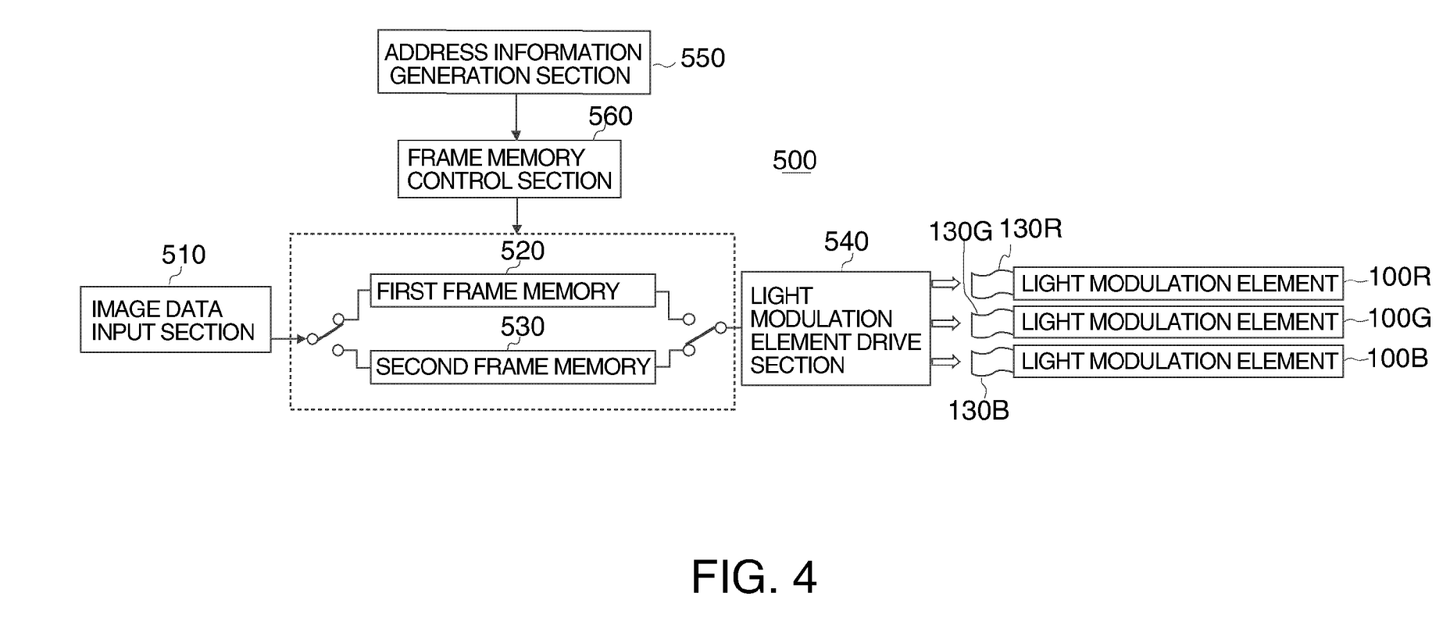
FIG. 4 is a diagram showing a configuration of an image data processing device in the projector according to the first embodiment.

In order for making the configuration of the light modulation element shown in FIG. 3 possible, in the projector according to the first embodiment, the image data processing device shown in FIG. 4 is provided.

FIG. 4 is a diagram showing a configuration of the image data processing device in the projector according to the first embodiment. As shown in FIG. 4, the image data processing device 500 has an image data input section 510 for inputting the image data to be displayed, a first frame memory 520 for storing the image data corresponding to one frame (one screen) of the image data input to the image data input section 510, a second frame memory 530 similarly storing the image data corresponding to one frame (one screen) of the image data, a light modulation element drive section 540 for driving each of the light modulation elements 100R, 100G, and 100B based on the image data retrieved from either one of the first frame memory 520 and the second frame memory 530, an address information generation section 550 for generating the address information when executing writing and retrieving of the image data on the first frame memory 520 and the second frame memory 530, and a frame memory control section 560 for controlling the writing and retrieving to and from the first and second frame memories 520, 530 based on the address information from the address information generation section 550.

It should be noted that in the projector according to the first embodiment, it is assumed that writing of the image data with the scanning direction along the long side direction is executed when writing the image data to the first and second frame memories 520, 530, and when retrieving the image data from the first and second frame memories 520, 530, a process of retrieving the image data with the scanning direction along the short side direction, namely a scanning direction conversion process is executed. Such a scanning direction conversion process is executed by the frame memory control section 560 based on the address information from the address information generation section 550.

In the configuration described above, the writing and retrieving control of the image data to and from the first and second frame memories 520, 530 by the frame memory control section 560 is executed in the following manner.

Now, it is assumed that the writing of the image data corresponding to a certain frame (assumed to be the nth frame) is completed in the first frame memory 520, and subsequently the writing of the n+1th frame to the second frame memory 530 has been started. In sync with the writing of the n+1th frame to the second frame memory 530, the image data corresponding to the nth frame, which has already been written, is retrieved from the first frame memory 520, and subsequently, in sync with the writing of the image data corresponding to the n+2th frame to the first frame memory 520, the image data corresponding to the n+1th frame, which has already been written, is retrieved from the second frame memory 530. In other words, the writing process and the retrieving process of the image data corresponding to one frame are alternately executed on the first frame memory 520 and the second frame memory 530.

The frame memory control section 560 executes the writing and retrieving control of the image data described above on the first and second frame memory 520, 530. In such a writing and retrieving control of the image data, when retrieving the image data from the first and second frame memories 520, 530, the scanning direction conversion process with the scanning direction parallel to the short side direction of the light modulation element. The scanning direction conversion process with the scanning direction parallel to the short side direction can be realized by obtaining the image data to each pixel based on the address information from the address information generation section 550.

Since the writing and retrieving of the image data are executed in the separate frame memories in the image data processing device shown in FIG. 4, the scanning direction conversion process for setting the scanning direction to be parallel to the short side direction can appropriately be executed. In other words, if it is attempted to execute the scanning direction conversion process with a single frame memory, when executing retrieving of the image data from the frame memory in order for setting the scanning direction to be parallel to the short side direction, there might be caused a problem that, for example, the image data written as the image data for the subsequent one frame exists in an area with the address for the image data corresponding to a certain pixel on which the retrieving process is executed. In contrast, as shown in FIG. 4, by executing the writing and retrieving of the image data on the separate frame memories (the first and second frame memories 520, 530) alternately, such a problem can be solved, and the image data corresponding to the one frame can appropriately be retrieved with the scanning direction parallel to the short side direction.

Further, when executing the writing and retrieving control of the image data described above on the first and second frame memories 520, 530, the frame memory control section 560 controls the writing and retrieving of the first frame memory 520 and the second frame memory 530 so that the writing of the image data corresponding to one frame and retrieving of the image data corresponding to one frame are in sync with each other. Thus, the writing and retrieving of the image data on the first frame memory 520 and the second frame memory 530 are finished simultaneously in each frame.

Since the frame memory control section 560 executes such writing and retrieving control, it becomes possible to continuously execute writing of the image data corresponding to one frame and retrieving of the image data corresponding to one frame, thus the image data thus retrieved can be output to the light modulation element drive section as the image data of the continuous frames.

As explained hereinabove, according to the projector related to the first embodiment, the light modulation elements 100R, 100G, and 100B are disposed so that the long sides thereof are adjacent to each other with respect to the cross dichroic prism 110. Thus, the volume of the cross dichroic prism 110 can be reduced, thus achieving the downsizing of the cross dichroic prism 110. Thus, the increase in productivity and the reduction in the cost of the optical elements such as the cross dichroic prism or the projection optical system can be achieved. Further, according to the present embodiment of the invention, since the focal length of the projection optical system can be shortened, a higher luminance can easily be achieved using a bright lens with a rather large aperture.

Further, according to the projector related to the first embodiment, since the FPC boards 130R, 130G, and 130B are coupled to the short sides of the respective light modulation elements 100R, 100G, and 100B, the problem that the FPC board shields the colored light input from the light source to the light modulation elements can be avoided. Further, in the projector according to the first embodiment, the scanning direction of each of the light modulation elements 100R, 100G, and 100B is set to be parallel to the short side direction of the light modulation elements. In this case, by executing the image data processing explained with reference to FIG. 4, the image data with the scanning direction parallel to the short side direction can appropriately be provided to the light modulation elements 100R, 100G, and 100B.

By setting the scanning direction to be parallel to the short side direction of the light modulation elements 100R, 100G, and 100B, the wiring space for leading a number of data lines from the data line driver 102 to the FPC boards 130R, 130G, and 130B can be reduced to an extremely small space in the case of coupling the FPC boards 130R, 130G, and 130B to the short sides of the respective light modulation elements 100R, 100G and 100B, thus the size of the overall light modulation element can be reduced to be a small size.

Further, by setting the scanning direction to be parallel to the short side direction, the number of data lines can also be reduced, thus the advantage of making it possible to reduce the width of the FPC boards 130R, 130G, and 130B can also be obtained. For example, in the case in which the each of the light modulation elements 100R, 100G and 100B has a resolution of 4K2K, the number of data lines on the short side becomes 2160, and therefore, in simple comparison on the number of data lines with the case of setting the scanning direction to be parallel to the long side direction in the light modulation element with the same resolution of 4K2K, the data lines roughly a half as many as the latter case are enough. Thus, the width of each of the FPC boards 130R, 130G, and 130B coupled to the respective light modulation elements 100R, 100G and 100B can be reduced.

It should be noted that although in the embodiment described above the scanning direction conversion process for setting the scanning direction to be parallel to the short side is arranged to be executed when retrieving the data from the first and second frame memories 520, 530, it is also possible to arrange that the scanning direction conversion process is executed when writing the data into the first and second frame memories 520, 530 instead of retrieving.

Second Embodiment

Figure 5:
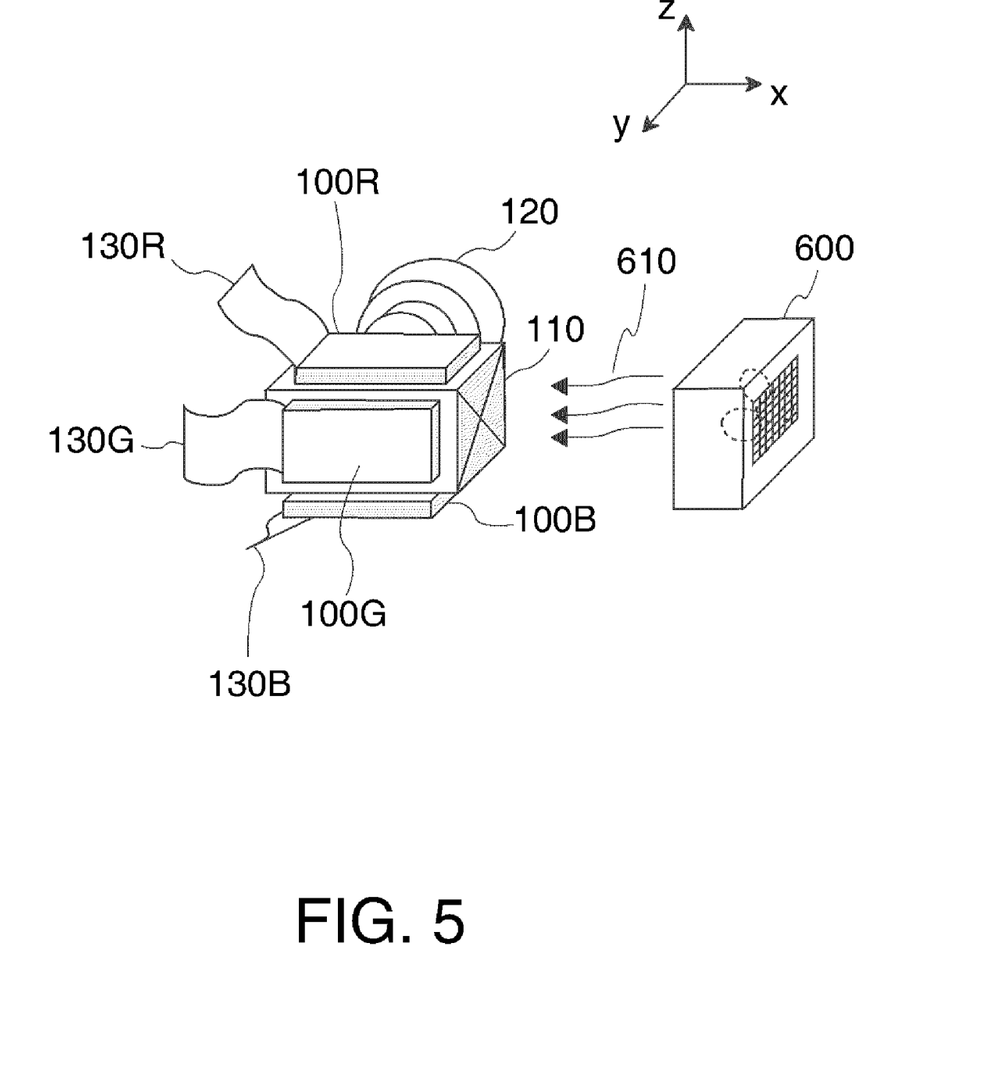
FIG. 5 is a diagram showing a configuration of light modulation elements and an optical system and so on in the periphery thereof in the projector according to a second embodiment.

FIG. 5 is a diagram showing a configuration of light modulation elements and an optical system and so on in the periphery thereof in the projector according to a second embodiment. The configuration of the light modulation elements and the optical system in the periphery thereof shown in FIG. 5 is substantially the same as that shown in FIGS. 1A and 1B, and what is different from that shown in FIGS. 1A and 1B is a cooling device 600 capable of cooling at least the light modulation elements 100R, 100G, and 100B provided thereto. It should be noted that the same constituents as those shown in FIGS. 1A and 1B are denoted with the same reference numerals.

As shown in FIG. 5, the projector according to the second embodiment has a structure in which the cooling air 610 from the cooling device 600 flows in a lateral direction, namely along the long side direction (the x-axis direction) of the light modulation elements 100R, 100G, and 100B. By thus flowing the cooling air in the lateral direction, there can be obtained an advantage of reducing the chances of accumulating the dust on the light modulation elements 100R, 100G, and 100B and the cross dichroic prism 110. In other words, the dust generally falls in the direction of gravitational force (-z direction in the z-axis), and therefore, by flowing the cooling air along the direction (the x-axis direction) perpendicular to the direction of gravitational force, it becomes possible to reduce the chances of accumulating the dust on the light modulation elements 100R, 100G, and 100B and the cross dichroic prism 110.

Further, also in the projector according to the second embodiment, it is possible to set the scanning direction to be parallel to the short side direction similarly to the first embodiment by executing the image data processing explained with reference to FIG. 4, thus the advantages described regarding the projector according to the first embodiment in addition to the advantage of reducing the chances of accumulating the dust on the light modulation elements 100R, 100G, and 100B, and the cross dichroic prism 110 are obtained.

It should be noted that the invention is not limited to the embodiments described above, but can be put into practice with various modifications within the scope or spirits of the invention. For example, although in the embodiments described above, the transmissive liquid crystal panels are explained, the invention can be put into practice with reflective liquid crystal panels.

Further, although in the embodiments, the explanations are presented assuming that the resolution of the light modulation elements 100R, 100G, and 100B is 4K2K, this is nothing more than an example, it is obvious that the resolution is not limited to the 4K2K.

The entire disclosure of Japanese Patent Application No. 2008-034116, filed Feb. 15, 2008 is expressly incorporated by reference herein.

What is claimed is:

1. A projector comprising:
    a plurality of light modulation elements adapted to modulate a plurality of colored light beams with respective color components based on image data;
    a combining optical system adapted to combine the colored light beams, which are modulated by the respective light modulation elements, to emit the combined colored light beams as image light; and
    a projection optical system adapted to project the image light emitted from the combining optical system on a projection screen,
    wherein, the light modulation elements are disposed with respect to the combining optical system so that long sides of the respective light modulation elements are adjacent to each other,
    signal line cable boards adapted to provide the respective light modulation elements with signals, and coupled to short sides of the respective light modulation elements, and
    a scanning direction of writing the image data to the light modulation elements is set to be parallel to a direction of the short side of an image display area in each of the light modulation elements.

2. The projector according to claim 1, further comprising:
    an image data processing device including
        a first frame memory and a second frame memory each capable of holding the image data to be displayed corresponding to one frame,
        an address information generation section adapted to generate address information for executing writing and retrieving the image data on the first frame memory and the second frame memory,
        a frame memory control section adapted to control writing and retrieving of the image data on the first frame memory and the second frame memory based on the address information from the address information generation section, and
        a light modulation element drive section adapted to drive each of the light modulation elements based on the image data retrieved from either one of the first frame memory and the second frame memory,
    wherein the frame memory control section, while writing the image data corresponding to one frame in one of the first frame memory and the second frame memory, retrieves the image data corresponding to one frame previously written in the other of the first frame memory and the second frame memory, and converts the scanning direction of writing the image data into the direction of the short side of the image display area of each of the light modulation elements in one of writing and retrieving the image data.

3. The projector according to claim 2, wherein the frame memory control section controls executing writing and retrieving of the image data on the first frame memory and the second frame memory so that the writing of the image data corresponding to the one frame and the retrieving of the image data corresponding to one frame are executed in sync with each other.

4. A projector comprising:
    a plurality of light modulation elements adapted to modulate a plurality of colored light beams with respective color components based on image data;
    a combining optical system adapted to combine the colored light beams, which are modulated by the respective light modulation elements, to emit the combined colored light beams as image light;
    a projection optical system adapted to project the image light emitted from the combining optical system on a projection screen; and
    a cooling device adapted to cool at least the light modulation elements,
    wherein, the light modulation elements are disposed with respect to the combining optical system so that long sides of the respective light modulation elements are adjacent to each other,
    signal line cable boards adapted to provide the respective light modulation elements with signals, and coupled to short sides of the respective light modulation elements, and
    the cooling device is disposed so as to flow the cooling air from the cooling device along a direction of the long side of each of the light modulation elements.

5. The projector according to claim 4, wherein a scanning direction of writing the image data to the light modulation elements is set to be parallel to a direction of the short side of an image display area in each of the light modulation elements.

* * * * *